(12) United States Patent
Vladimirov et al.

(10) Patent No.: US 10,814,770 B2
(45) Date of Patent: *Oct. 27, 2020

(54) SYSTEM AND METHOD FOR DELIVERY AND INSTALLATION OF AUTOMOBILE TIRES

(71) Applicant: BeOutsourced LLC, Medina, MN (US)

(72) Inventors: Peter Vladimirov, Medina, MN (US); Konstantin Zuyev, Plymouth, MN (US)

(73) Assignee: BEOUTSOURCED LLC, Medina, MN (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/125,851

(22) Filed: Sep. 10, 2018

(65) Prior Publication Data

US 2019/0001861 A1    Jan. 3, 2019

Related U.S. Application Data

(63) Continuation of application No. 14/714,540, filed on May 18, 2015, now Pat. No. 10,071,671.

(Continued)

(51) Int. Cl.
*G06Q 30/00* (2012.01)
*B60P 3/14* (2006.01)
(Continued)

(52) U.S. Cl.
CPC ............... *B60P 3/14* (2013.01); *B60P 1/02* (2013.01); *G06Q 10/083* (2013.01); *G06Q 10/20* (2013.01);
(Continued)

(58) Field of Classification Search
None
See application file for complete search history.

(56) References Cited

U.S. PATENT DOCUMENTS

| 4,688,308 A | 8/1987 | Alvarez |
| 5,833,294 A | 11/1998 | Williams et al. |

(Continued)

FOREIGN PATENT DOCUMENTS

| WO | 0068856 A2 | 11/2000 |
| WO | 0108071 A1 | 2/2001 |
| WO | 0186540 A1 | 11/2001 |

OTHER PUBLICATIONS

"Tires to go: TireVan brings the tire store to you", Consumer Reports News: Oct. 28, 2010 (3 pages).

(Continued)

*Primary Examiner* — William J Allen
(74) *Attorney, Agent, or Firm* — Dmitry Zuev, Esq.

(57) ABSTRACT

Provided is a system for delivery and installation of automobile tires at a customer's location, the system comprising: an order system allowing the customer to place an order for the tires, and to reserve a delivery time window; a distribution center storing the tires; and a delivery system for delivering the tires to the customer and installing the tires on a customer's vehicle. Also provided is a method for delivery and installation of automobile tires at a customer's location, the method comprising: receiving a tire order from the customer and a desired delivery time window; locating a tire having specifications according to the order from the customer; delivering the tire from a distribution center to a customer's location; and installing the tire on a customer's vehicle at the customer's location.

20 Claims, 5 Drawing Sheets

Related U.S. Application Data

(60) Provisional application No. 62/135,824, filed on Mar. 20, 2015.

(51) Int. Cl.
*G06Q 10/08* (2012.01)
*G06Q 30/06* (2012.01)
*B60P 1/02* (2006.01)
*G06Q 10/00* (2012.01)

(52) U.S. Cl.
CPC ..... *G06Q 30/0601* (2013.01); *G06Q 30/0603* (2013.01); *G06Q 30/0635* (2013.01)

(56) References Cited

U.S. PATENT DOCUMENTS

| | | | |
|---|---|---|---|
| 9,053,588 | B1 | 6/2015 | Briggs et al. |
| 2001/0047303 | A1 | 11/2001 | Greenstone |
| 2001/0049644 | A1 | 12/2001 | Webb et al. |
| 2003/0139967 | A1 | 7/2003 | Carleton |
| 2006/0131382 | A1 | 6/2006 | Thatcher |
| 2009/0299794 | A1 | 12/2009 | Marchi et al. |
| 2011/0153459 | A1 | 6/2011 | Kirian et al. |
| 2013/0204655 | A1 | 8/2013 | Damon |
| 2015/0246631 | A1 | 9/2015 | Konchan et al. |

OTHER PUBLICATIONS

AutoSquad marketing video. https://www.youtube.com/watch?v=IWwHf56PE_4. Published Apr. 25, 2013.

TireRack.com Continues to Expand National Reach With New Distribution Center in Denver, Oct. 16, 2004, 11:30 ET from TireRack.com, 2014.

www.autosquad.com Dated from May 26, 2013 to Jun. 30, 2013. Recovered from www.archive.org (40 pages).

www.TireRack.com [recovered from www.Archive.org]. Dated from Jun. 9, 2004 to Feb. 18, 2010, (Year: 2010).

SYSTEM AND METHOD FOR DELIVERY AND INSTALLATION OF AUTOMOBILE TIRES

CROSS-REFERENCE TO RELATED APPLICATION

This application is a continuation of U.S. application Ser. No. 14/714,540, filed May 18, 2015, which claims the benefit of U.S. Application No. 62/135,824, filed Mar. 20, 2015, the contents of which are incorporated herein in their entirety by reference.

TECHNICAL FIELD

The present disclosure relates to a system and method for delivery and installation of automobile tires at a location of client's choice.

BACKGROUND

An automobile tire is a consumable product, which after a period of use needs to be replaced. At the time a user desires to order a replacement tire, he or she confronts several problems including: (1) where can the user find a source for replacement tires; (2) will that tire source have the desired tire product available in its inventory; (3) is the tire source the closest source to the user so that the user can minimize his/her shipping costs to obtain the replacement tires? The user needs to spend time searching for tire vendors, visiting their web sites to find out the tire size and availability, contact the tire service center, schedule an appointment to replace the old tires, drive to the service location on the day of the appointment, and wait there for the service to be performed.

It would be advantageous to have an alternative method of quickly, conveniently, and economically ordering, delivering, and installing automobile tires at a location of the customer's choice.

SUMMARY

Provided is a system for delivery and installation of automobile tires at a customer's location, the system comprising:

an order system allowing the customer to place an order for the tires, and to reserve a delivery time window;

a distribution center storing the tires; and a delivery system for delivering the tires to the customer and installing the tires on a customer's vehicle.

Also provided is a method for delivery and installation of automobile tires at a customer's location, the method comprising:

receiving a tire order from the customer and a desired delivery time window;

locating a tire having specifications according to the order from the customer;

delivering the tire from a distribution center to a customer's location; and installing the tire on a customer's vehicle at the customer's location.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
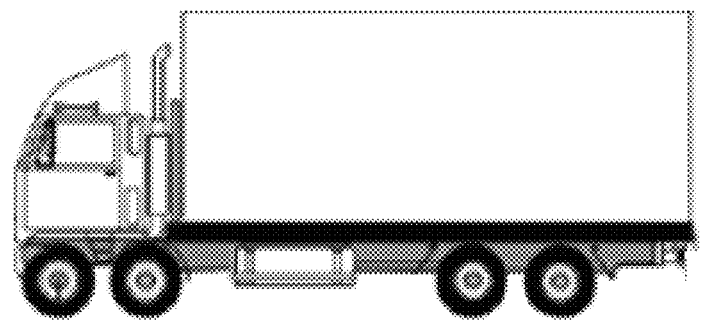
FIG. 1 illustrates an embodiment in which the tire shop equipment is included in the truck trailer, which is permanently attached to the truck.

Reference will now be made in detail to the embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The present inventive concept provides a system for delivery and installation of automobile tires at a customer's location.

An embodiment provides a system for delivery and installation of automobile tires at a customer's location, the system including:

an order system allowing the customer to place an order for the tires and to reserve a delivery time window;

a distribution center storing the tires; and a delivery system for delivering the tires to the customer's location and installing the tires on a customer's vehicle.

The system for delivery and installation of automobile tires may include an order system. The order system is a system through which a customer makes a tire order. The order can be placed by any communication means available to the customer. For example, the order can be placed by a computer, a fax, a phone, or any other communication network. The computer order may be placed by electronic mail (e-mail). The order will specify a make and model of the customer's vehicle, customer's address, and the time window for a replacement service. Thus, a customer may be given an opportunity to select a delivery and installation time window offered by the provider.

The system for delivery and installation of automobile tires may further include a distribution center storing the tires. The distribution center may be a warehouse or any suitable establishment for tire storage.

The system for delivery and installation of automobile tires may further include a delivery system for delivery of the tires to the customer and for installation of the tires on a customer's vehicle. The delivery system may include a means for delivering the tires to the customer, a means for storing the tires in the course of delivery, and a means for installing the tires on the customer's vehicle. The means for delivering the tires to the customer may include a provider's vehicle. The means for storing the tires may include a rack. A rack may be located inside the provider's vehicle and is designed to conveniently store the tires during the transportation from the distribution center to the customer's location. The transported automobile tires may be used or new tires, and may be round tires made of rubber, polymers, reinforcement materials, or a combination thereof, but are not limited thereto.

Figure 2:
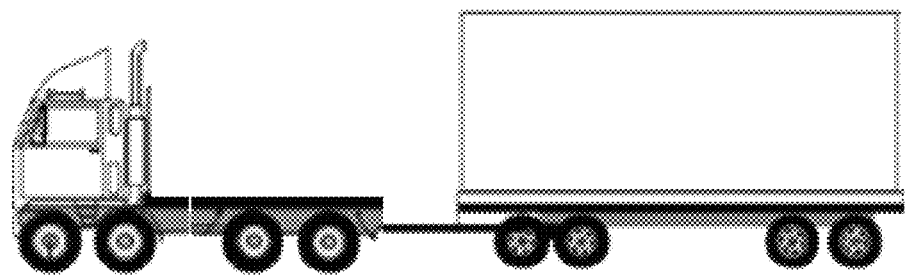
FIG. 2 illustrates an embodiment in which the tire shop equipment resides in a trailer that is not permanently attached to the towing vehicle.
Figure 3:
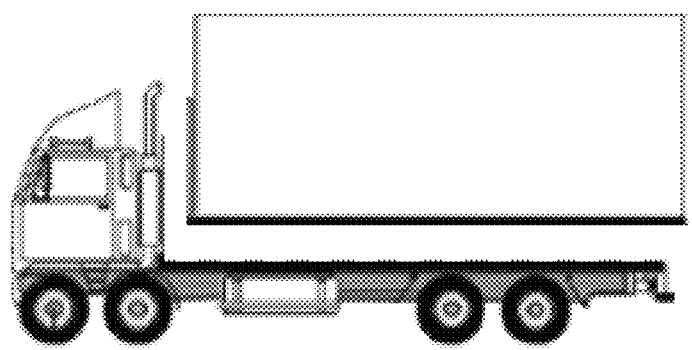
FIG. 3 illustrates an embodiment in which the tire shop equipment may reside in a container that is not permanently attached to the towing vehicle but lies on the top of the vehicle.

The installation of automobile tires takes place at the location of the customer's choice, and not at the provider's location (such as a dealership or workshop). Thus, it is desired to deliver the tools, machines, and mechanisms required for tire dismantling and installation to the customer's location. In an embodiment, the means for installing the tires on the customer's vehicle may include tire shop equipment, such as a tire changer, a tire remover, a wheel balancer, an air compressor, a power generator, a car lifter, or a combination thereof. However, the tools and instruments are not limited thereto and any suitable equipment known to one of ordinary skill in the art may be used. In an embodiment, the tire shop equipment may be included in the truck trailer, which is permanently attached to the truck (FIG. 1). In another embodiment, the tire shop equipment may reside in a trailer that is permanently or non-permanently attached to the towing vehicle (FIG. 2). In yet another embodiment, the tire shop equipment may reside in a container that is permanently or non-permanently attached to the towing vehicle and lies on the top of the vehicle (FIG. 3).

Figure 4:
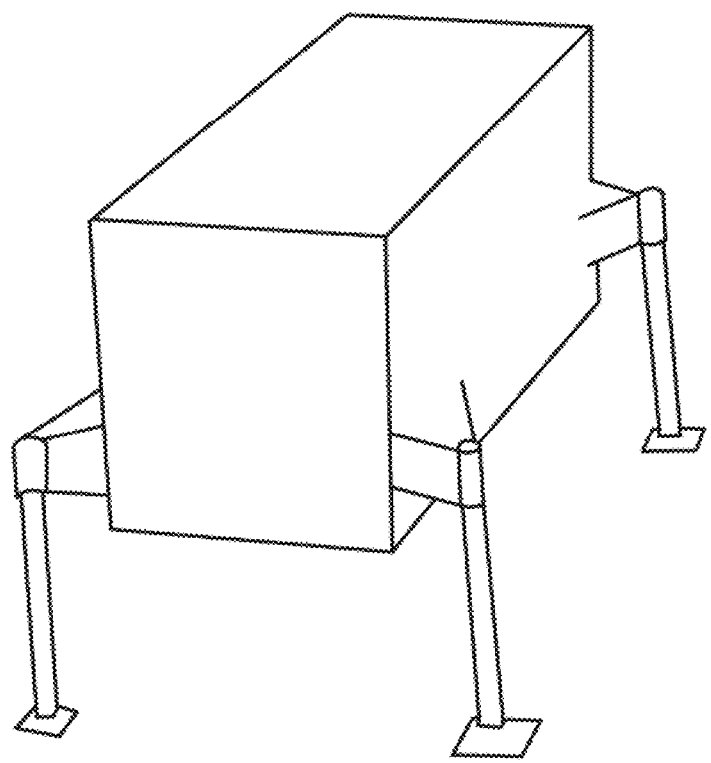
FIG. 4 illustrates an embodiment in which the container housing the equipment is leveled by an automated pneumatic jack leveling system.
Figure 5:
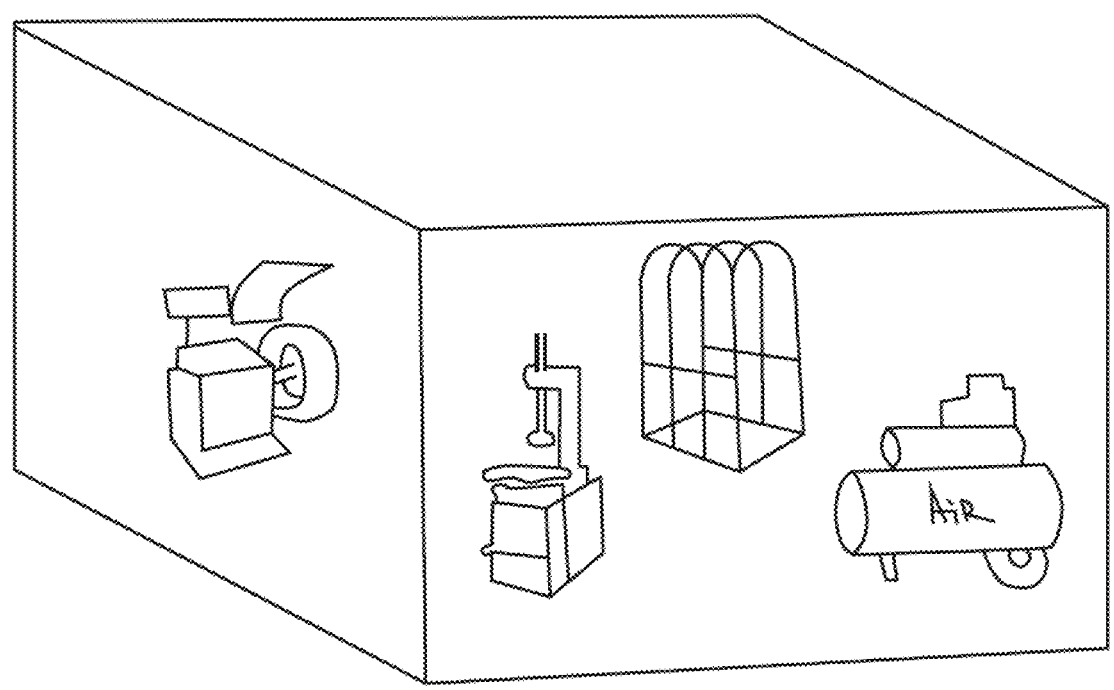
FIG. 5 illustrates an embodiment in which the entire tire changing equipment is mounted in the truck trailer or truck container.
Figure 6:
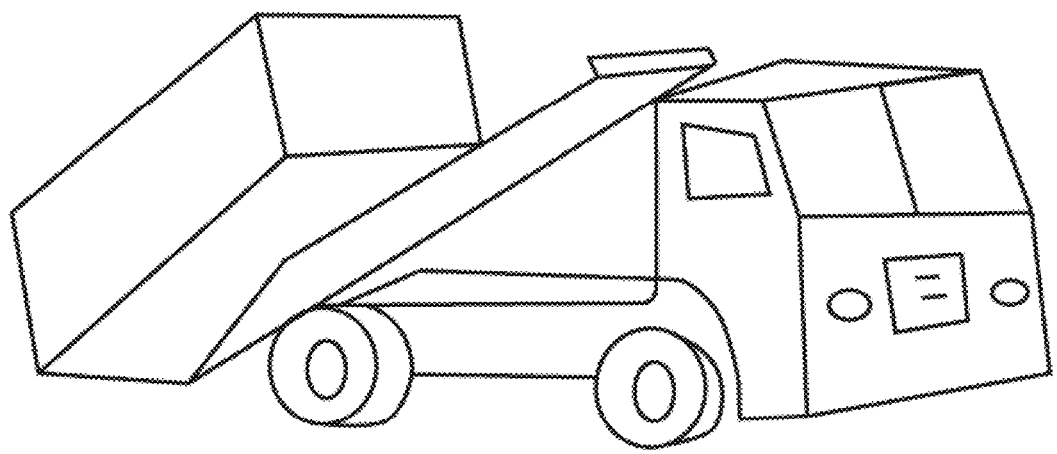
FIG. 6 illustrates an embodiment of tire balancing in which the entire trailer is lowered onto the street floor by sliding it off the platform.
Figure 7:
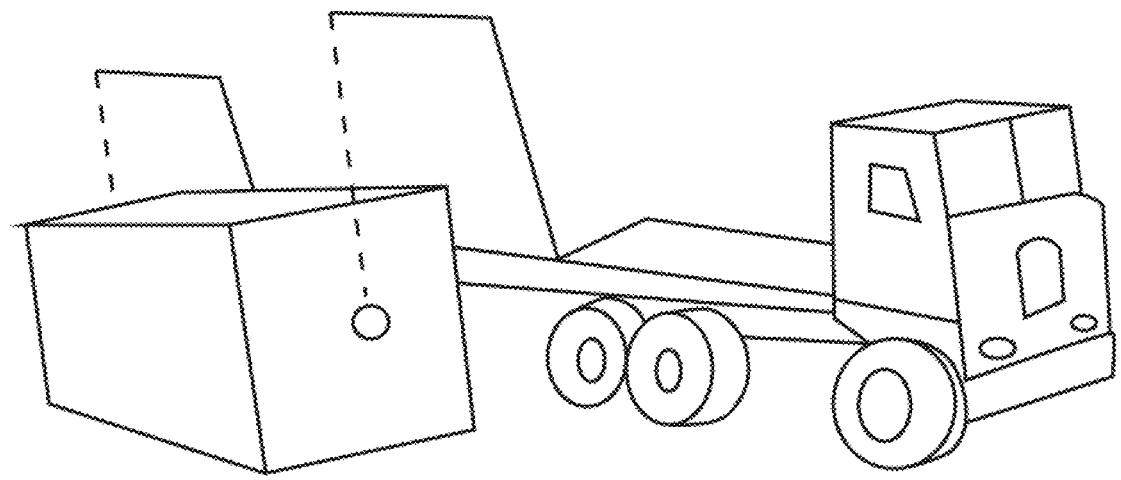
FIG. 7 illustrates an embodiment of tire balancing in which the entire trailer is lowered onto the street floor by using container side lifting equipment.
Figure 8:
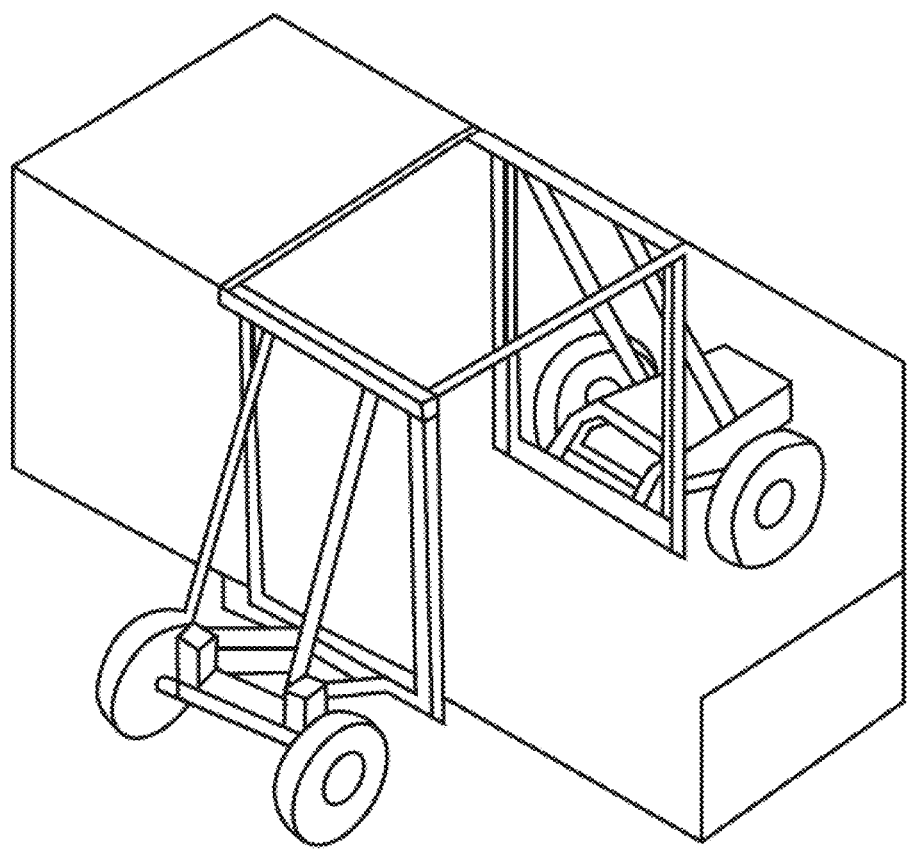
FIG. 8 illustrates an embodiment of tire balancing in which the entire trailer is lowered onto the street floor by lowering the entire container to the ground mechanism.
Figure 9:
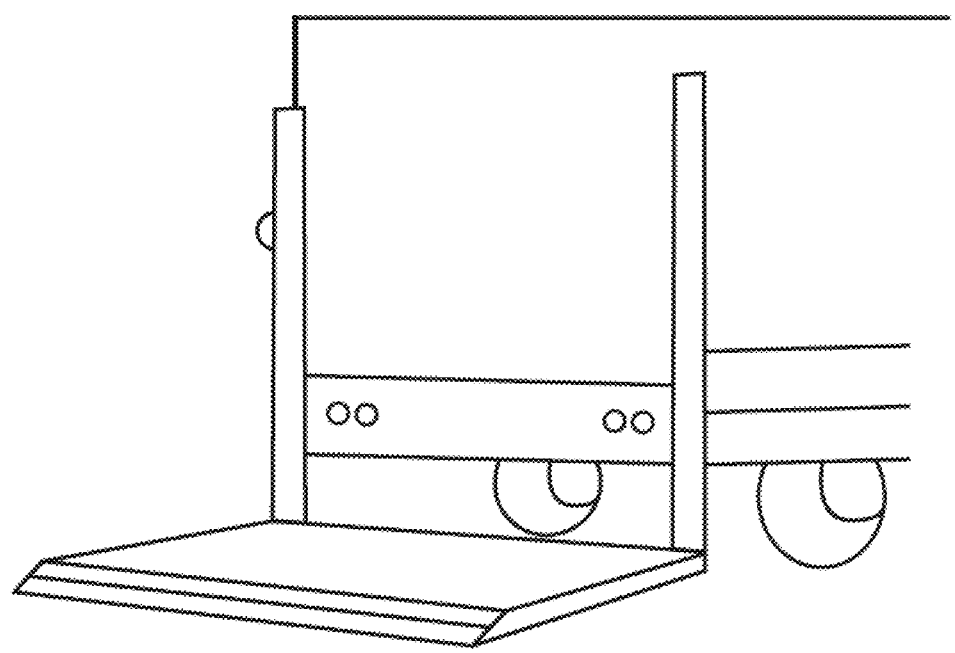
FIG. 9 illustrates an embodiment in which the tire balancer and the tire changer are lowered from the truck container to the ground by using Tommy Gate attached to the back of the truck container.
Figure 10:
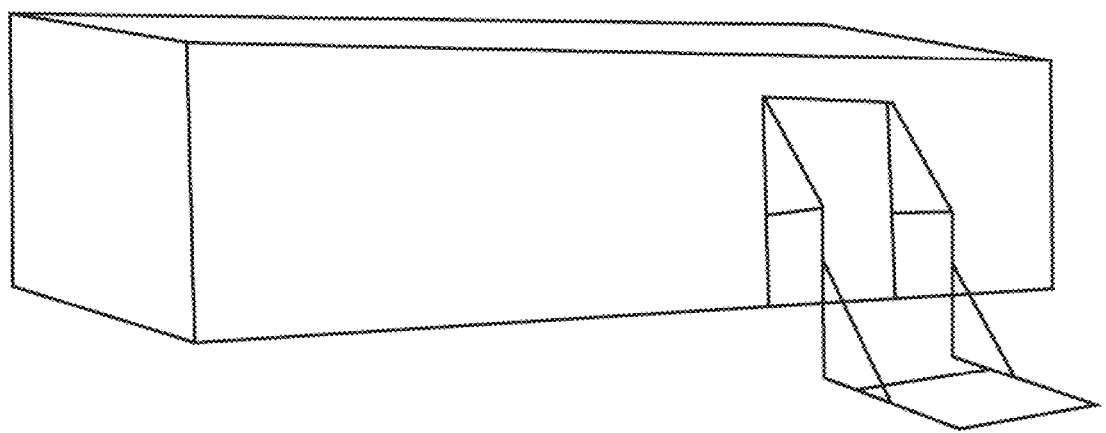
FIG. 10 illustrates an embodiment in which the tire balancer and the tire changer are lowered from the truck container to the ground by using a handicapped lift.

The purpose and function of the tire removing/installing tools are well-known to one of ordinary skill in the art. A tire changer and a tire remover may be used to strip an old tire and install a new tire on the same metal wheel or on a different metal wheel. A wheel balancer may be used to balance the new tire before the installation. It is important to balance a replacement tire on a stationary support such as a flat floor of solid construction, preferably concrete. If the balancer is not leveled, or is placed on an unstable floor, it will not function properly and will produce inaccurate balance readings. In order for the tire balancer equipment to be accurate, the container housing the equipment must be leveled by manual jacks or an automated pneumatic jack leveling system (FIG. 4). Various methods of power gear hydraulic leveling are known to one of ordinary skill in the art and are described, for example, at http://www.power-gearus.com/products/leveling-systems, a web site which is incorporated herein by reference. If possible, the balancer should be bolted down to the support. The balancer will not function properly if operated on the pallet. Thus, it is important to select a location for the balancer that provides a level, solid floor, and adequate clearance around and above the balancer. As stated above, the tire balancer may be mounted on (for example, bolted to) a truck or trailer, which may be leveled and stabilized in a stationary position by using leveling jacks. In this embodiment, the entire tire changing equipment is mounted in the truck trailer or truck container, while the operator carries the tires inside the container, where he or she performs the tire changing operation (FIG. 5). The balancer can be bolted down to the container carrying the equipment or to the trailer carrying the equipment. When the tire balancing is performed on a trailer, the entire trailer may be lowered onto the street floor by sliding it off the platform (FIG. 6), by using container side lifting equipment (FIG. 7), or by lowering the entire container to the ground mechanism (FIG. 8). The trailer is then leveled to provide a stationary support for the tire balancer. In another embodiment, the tire balancer and the tire changer can be lowered from the truck container to the ground by using Tommy Gate attached to the back of the truck container (FIG. 9) or a handicapped lift (FIG. 10). But the means of lowering the equipment are not limited thereto and any suitable means known to one of ordinary skill in the art can be utilized.

Meanwhile, an air compressor and a power generator may be used to power tire removing and tire balancing equipment. A car lifter may be used to lift a side of a customer car or truck in order to remove an old tire. The means for installing the tires on the customer's vehicle may further include a bead seater, a portable light, a tire inflation cage, a tire repair kit, a torque wrench, a plurality of power lug nut removal tools, a lug, a set of manual lug wrenches, a wheel balancer weight, a weight removal tool, a rim polishing tool, a valve replacement/repair kit, or a combination thereof. However, the means for installing the tires are not limited thereto and any equipment within the knowledge of an ordinary car mechanic can be carried over to the customer's location in the provider's vehicle.

The removal of an old tire and the installation of the new tire may be performed by a driver of the provider's vehicle or by another operator. The old tires may be placed on a vehicle rack and driven away from the customer's location to the warehouse. Upon completion of the tire replacement process, the customer will pay the remainder of the order and will have a choice of keeping the old tires or paying for their disposal. Alternatively, the customer may pay for the order prior to the tire delivery and installation as disclosed below. The method of payment may be any method set forth by the provider. For example, the method of payment may be a cash payment or a credit card payment. When payment by cash is chosen, the cost of tires, tire delivery and installation, as well as miscellaneous supplies is calculated including taxes. When payment by a credit card is chosen, the cost of tires, tire delivery and installation, as well as miscellaneous supplies is calculated including taxes, and the purchaser's credit card is requested to authorize a charge for the order.

The delivery and installation of the automobile tire is prompt and usually takes place no later than 9 PM on a third day after the order is placed. For example, the tires may be delivered and installed on the following day from receiving the customer's order, within seven hours or even within three hours from receiving the customer's order. The ability of the provider to deliver and install the ordered tires depends on commercial availability of tires. If the tires are in stock at the distribution center, the delivery and installation can be completed within three hours from the time of receiving the customer's order. However, if the tires are out of stock, or if the customer desires to buy customized tires, longer time may be needed for delivery and installation. The customer's location may be within 200 miles from the distribution center, for example, 100 mile from the distribution center, or for example, 50 miles from the distribution center.

In addition to the tire replacement, other automobile repair and maintenance procedures can be performed at the customer's location. For example, a brake replacement and oil change services can be performed upon customer's request.

The present inventive concept further provides a method of delivery and installation of automobile tires at the customer's location.

In another embodiment, provided is a method for delivery and installation of automobile tires at a customer's location, the method including:

receiving a tire order from the customer and a desired delivery time window;

locating a tire having specifications according to the order from the customer;

delivering the tire from a distribution center to a customer's location; and installing the tire on a customer's vehicle at the customer's location.

Initially, a customer places an order through a means of communication, which is subsequently received by the provider. For example, a means of communication may be a phone, a fax, a computer communication over the Internet, or any other common and convenient communication means. The Internet, including a vast number of interconnected computers and computer networks, is a suitable and convenient resource for establishing communication between a customer's computer and various computer servers of the provider. In general, an order can be placed by any suitable computer communication means, including direct connection by telephone line, wireless communication links, fax line, or the like.

In an embodiment, a customer's computer is electronically linked to a provider's system server over a communication network over the Internet. The computer can use a browser software package to locate and connect to the provider's server over the Internet. Alternatively, the computer can contact the server directly over a telephone line or wireless cellular connection. It is understood that any other communication link that allows for information exchange between computers can also be used. The server may include a single server, but may also include a plurality of server machines linked together. The server supports a plurality of electronic documents or pages in HTML or another markup format which are transmittable to the customer's computer for display on the monitor screen.

The server transmits information to the customer's computer to allow the customer to view and custom select features for one or more tires, to order for purchase the customized tires, and to choose a delivery window as explained in greater detail below.

The server includes links to subsystems, including a credit card authorization system and a subsystem containing a tire fitment guide. The server will also allow the customer to connect to a subsystem to aid in determining the correct fitment for the tire, that is, will allow the customer to identify the correct size tire for his or her vehicle.

According to another embodiment, a tire selection subsystem, which may be incorporated in the tire fitment subsystem, can provide information for assisting the customer to select a tire make and model for his or her vehicle.

The server generates the order file, and makes the order file available for a provider's customer service entity to retrieve, track, and service the order. An order identifier number is assigned and sent to the customer.

To order a customized tire, the customer's computer contacts the provider's server to establish communication. The server transmits an electronic document or page to the customer's computer that includes information inviting the customer to select certain elements for a customized tire and purchase the customized tire.

Once the desired tire is selected, the customer may proceed to order the customized tire or tires. The purchase is completed by the customer providing certain information, including name, address, shipping address (if different), credit card number, number of tires, and tire size. If the customer does not know the appropriate tire size, he or she will be directed by the server to a subsystem having a data base for identifying recommended tire sizes for vehicles.

A credit subsystem will verify the credit information provided by the customer to obtain authorization to charge the customer's account. If the charge is authorized, the server allows the customer to continue. If the charge is not authorized, the process stops, and the customer is asked to verify the credit information or provide another credit card number to continue.

The order is generated by organizing the information related to the order into an electronic file, which is assigned an order number. A communication confirming the receipt of the order, and including the order number is returned to the customer by e-mail, wireless phone messaging, or any other suitable and convenient means.

Once the order is placed, a provider will locate a tire having desired specifications according to the order from the customer, place the tire in the vehicle, deliver the tire to the specified customer's location within the time window selected by the customer, and install the tire on a customer's vehicle at the customer's location.

The delivery and installation of the automobile tire is prompt and usually takes place no later than 9 PM on a third day after the order is placed. For example, the tires may be delivered and installed on the following day from receiving the customer's order, within seven hours or even within three hours from receiving the customer's order. The ability of the provider to deliver and install the ordered tires depends on commercial availability of tires. If the tires are in stock at the distribution center, the delivery and installation can be completed within three hours from the time of receiving the customer's order. However, if the tires are out of stock, or if the customer wishes to buy customized tires, generally, longer time is required for delivery and installation. The customer's location may be within 200 miles from the distribution center, for example, within 100 mile from the distribution center, or for example, within 50 miles from the distribution center.

The system for delivery and installation of automobile tires may further include a distribution center storing the tires. The distribution center may be a warehouse or any suitable place for tire storage.

As stated above, the means for delivering the tires to the customer may include a provider's vehicle. The means for storing the tires may include a rack. A rack may be located inside the provider's vehicle and is designed to conveniently store the tires during the transportation from the distribution center to the customer's location. The transported automobile tires may be used or new tires, and may be round tires made of rubber, polymers, reinforcement materials, or a combination thereof, but are not limited thereto.

As further stated above, the installation of automobile tires takes place at the customer's location, and not at the provider's location, such as a dealership or workshop. Thus, the means for installing the tires on the customer's vehicle may include tools and instruments which would allow installing a tire at the customer's location, such as a tire changer, a tire remover, a wheel balancer, an air compressor, a power generator, a car lifter, or a combination thereof. The means for installing the tires may additionally include a bead seater, a portable light, a tire inflation cage, a tire repair kit, a torque wrench, a plurality of power lug nut removal tools, a lug, a set of manual lug wrenches, a wheel balancer weight, a weight removal tool, a rim polishing tool, a valve replacement/repair kit, or a combination thereof. However, the tools and instruments are not limited thereto and any suitable tool or instrument known to one of ordinary skill in the art can also be included.

The removal of an old tire and the installation of the new tire may be performed by a driver of the provider's vehicle or by another operator. The old tires may be placed on a vehicle rack and driven away from the customer's location to the warehouse.

The present inventive concept has been described in terms of exemplary principles and embodiments, but those skilled in the art will recognize that variations may be made and equivalents substituted for what is described without departing from the scope and spirit of the disclosure as defined by the following claims.

What is claimed is:

1. A system for delivery and installation of automobile tires at a customer's location, the system comprising:
   an order device allowing the customer to place an order for the tires, and to reserve a delivery time window;
   a distribution center storing the tires; and
   a delivery device for delivering the tires from the distribution center to the customer and installing the tires on a customer's vehicle,
   wherein the delivery device is a provider's vehicle comprising:
      a movable platform, and
      a container disposed on and detachable from the movable platform, wherein the container accommodates equipment for balancing and installing the tires.

2. The system for delivery and installation of automobile tires of claim 1, wherein the movable platform is a trailer.

3. The system for delivery and installation of automobile tires of claim 1, wherein the delivery device comprises a means for repairing the tires.

4. The system for delivery and installation of automobile tires of claim 1, wherein the delivery device comprises a means for storing the tires, a means for delivering the tires to the customer, and a means for installing the tires on the customer's vehicle.

5. The system for delivery and installation of automobile tires of claim 4, wherein the means for storing the tires comprises a rack.

6. The system for delivery and installation of automobile tires of claim 1, wherein the provider's vehicle further comprises a hydraulic lifting equipment attached to a side of the container for lowering the tire balancing and installing equipment.

7. The system for delivery and installation of automobile tires of claim 4, wherein the means for installing the tires on the customer's vehicle comprises a tire changer, a tire remover, a tire balancer, an air compressor, a power generator, a car lifter, or a combination thereof.

8. The system for delivery and installation of automobile tires of claim 4, wherein the means for installing the tires on the customer's vehicle further comprises a bead seater, a portable light, a tire inflation cage, a tire repair kit, a torque wrench, a plurality of power lug nut removal tools, a lug, a set of manual lug wrenches, a wheel balancer weight, a weight removal tool, a rim polishing tool, a valve replacement/repair kit, or a combination thereof.

9. A method for delivery and installation of automobile tires at a customer's location, the method comprising:
   receiving a tire order from the customer and a desired delivery time window;
   locating a tire having specifications according to the order from the customer at a distribution center;
   delivering the tire from the distribution center to a customer's location by a provider's vehicle comprising:
      a movable platform, and
      a container disposed on and detachable from the movable platform, wherein the container accommodates equipment for balancing and installing the tires; and
   installing the tire on a customer's vehicle at the customer's location.

10. The method of claim 9, wherein the delivering the tire from the distribution center to a customer's location is followed by:
   lowering the container from the platform to the ground,
   leveling the container on the ground, and
   balancing the tire inside the leveled container prior to the installing the tire on a customer's vehicle at the customer's location.

11. The method of claim 10, wherein the lowering the container from the platform to the ground is conducted by sliding the container off the platform.

12. The method of claim 9, wherein the provider's vehicle further comprises a hydraulic lifting equipment attached to a side of the container for lowering the tire balancing and installing equipment.

13. The method of claim 9, wherein the tires are customized tires.

14. The method of claim 9, wherein receiving a tire order from the customer and reserving a delivery time takes place through computer communication comprising a wireless communication link, a fax line, or a telephone line, and wherein installing the tire on a customer's vehicle takes place within three hours from receiving the customer's order.

15. The method of claim 9, wherein the provider's vehicle carries a tire changer, a tire remover, a tire balancer, a rack for tire storage, an air compressor, a power generator, a car lifter, or a combination thereof.

16. The method of claim 9, wherein the movable platform is a trailer.

17. The method of claim 9, wherein the provider's vehicle further carries a bead seater, a portable light, a tire inflation cage, a tire repair kit, a torque wrench, a plurality of power lug nut removal tools, a lug, a set of manual lug wrenches, a wheel balancer weight, a weight removal tool, a rim polishing tool, a valve replacement/repair kit, or a combination thereof.

18. The method of claim 15, wherein installing the tire on a customer's vehicle is performed by a driver of the provider's vehicle.

19. The method of claim 9, wherein the delivery device comprises a means for repairing the tires.

20. The method of claim 9, wherein installing the tire on a customer's vehicle is preceded by removing a used tire from the customer's vehicle and repairing the used tire.

* * * * *